United States Patent [19]

Mondal et al.

[11] Patent Number: 6,072,839
[45] Date of Patent: Jun. 6, 2000

[54] DVB FRAME SYNCHRONIZATION

[75] Inventors: Kalyan Mondal, Berkeley Heights; Radha Sankaran, Woodbridge; James C. Lui, Bedminster, all of N.J.

[73] Assignee: Lucent Technologies, Inc., Murray Hill, N.J.

[21] Appl. No.: 08/899,534

[22] Filed: Jul. 24, 1997

[51] Int. Cl.[7] .................................. H04J 3/06; H04L 5/12
[52] U.S. Cl. .......................... 375/265; 375/260; 375/368; 375/364; 370/512; 370/514; 348/513; 348/521
[58] Field of Search ..................... 348/500, 521, 348/526, 513; 375/260, 265, 368, 363, 364, 354; 370/512, 513, 514, 570, 268, 230, 235; H04L 7/00, 5/12; H04J 3/06

[56] References Cited

U.S. PATENT DOCUMENTS

| | | | |
|---|---|---|---|
| 4,607,378 | 8/1986 | Catlin | 375/116 |
| 4,611,336 | 9/1986 | Fryer | 375/111 |
| 4,849,995 | 7/1989 | Takeo | 375/116 |
| 4,855,995 | 8/1989 | Hiyama | 370/86 |
| 5,058,141 | 10/1991 | Kem | 375/116 |
| 5,291,286 | 3/1994 | Murakami | 348/469 |
| 5,588,003 | 12/1996 | Ohba | 370/486 |
| 5,592,518 | 1/1997 | Davis | 375/368 |
| 5,677,935 | 10/1997 | Karino | 375/368 |
| 5,734,969 | 3/1998 | Shiraishi | 455/72 |
| 5,745,481 | 4/1998 | Phillips | 370/313 |
| 5,757,869 | 5/1998 | Sands | 375/366 |
| 5,838,677 | 11/1998 | Kozaki | 370/389 |
| 5,862,143 | 1/1999 | Suh | 370/153 |

*Primary Examiner*—Mark R. Powell
*Assistant Examiner*—Wesner Sajous

[57] ABSTRACT

The invention presents a method of frame synchronization of Digital Video Broadcasting (DVB) data using a temporary storage area (regfile) of substantially smaller dimension than the repetition rate of the sync pattern. Synchronization is achieved by detecting the sync pattern by correlation and determining if the pattern has a fixed repetitive separation. The synchronization scheme of the invention is simple and easily implementable as an integrated circuit, using software and a microprocessor, or as discrete circuitry.

32 Claims, 3 Drawing Sheets

DVB FRAME SYNCHRONIZATION

FIELD OF THE INVENTION

The invention pertains to the field of digital data stream synchronization. More particularly, the invention pertains to methods and apparatus for detection of synchronization in digital video broadcasting and similar applications.

BACKGROUND OF THE INTENTION

MPEG (Motion Pictures Experts Group) was an outgrowth of earlier standards work for digital compression of still pictures. The international MPEG committee started in 1988 with the goal of standardizing video and audio for compact discs. The compression work for MPEG-1 was based upon film or other progressive sources. By 1990 the MPEG committee had created a data structure syntax for Source Input Format (SIF) video and compact disc audio using a combined data rate of 1.5 Mbit/Sec. This system approximated the perceptual quality of VHS consumer video tape, making MPEG video compression a visually acceptable technology. Although this MPEG standard was viable for progressive sources like film, it lacked the techniques to deal with standard broadcast interlaced video with good compression.

In 1992 over 200 companies from around the world were involved in the MPEG-2 draft development, demonstrating strong support for the technology specification. Today, MPEG-2 syntax has been adopted for the United States Grand Alliance High Definition Television (HDTV) specification, the European Digital Video Broadcasting Group, and for the high density compact disc. MPEG 2 and MPEG 2 "near compliant" is also the backbone of commercially operational Direct Broadcast Satellite (DBS) systems like DirecTV or USSB. MPEG encoded video offers broadcasters the ability to transmit more programs on a given transmission channel. This means more channels at a lower infrastructure cost. In addition, digitally encoded streams eliminate drift, remove certain kinds of analog distortion, and reduce system wide maintenance.

MPEG is, generically, a means of compactly representing digital video and audio signals for consumer distribution. The basic idea is to transform a stream of discrete samples into a bitstream of tokens which takes less space, but is just as filling to the eye or ear. This "transformation" exploits perceptual and even some actual statistical redundancies.

MPEG currently consists of two operating specifications, MPEG 1 and MPEG 2. MPEG 1 was developed for progressive source materials like film, while MPEG 2 was enhanced to address the interlaced materials common in broadcast TV. Both standards include video, audio, and systems components such as time stamping for synchronization. The orthogonal dimensions of Video and Audio streams can be further linked with the Systems layer— MPEG's own means of keeping the data types synchronized and multiplexed in a common serial bitstream.

The essence of MPEG is its syntax: the little tokens that make up the bitstream. MPEG's semantics tell a decoder how to transform the compact tokens back into something resembling the original stream of samples. These semantics are merely a collection of agreed-upon rules which are highly reactive to combinations of bitstream elements set in headers and so forth.

The Digital Video Broadcasting (DVB) group has specified a framing structure for the QAM/QPSK transmission of MPEG-2 transport stream packets in its ETS standard. Each frame consists of a frame header packet that includes a byte with hexadecimal value "b8" (hereinafter abbreviated "0xb8") in the packet sync position and 7 additional transport stream packets with the hexadecimal byte "47" (hereinafter abbreviated "0x47") in their packet sync positions. Each of these transport stream packets is comprised of 204 bytes of data with sync byte being the first byte of the packet. Depending on the modulation scheme, the data frame is subdivided into fixed length symbols prior to transmission. At the receiving end these symbols are recovered through, for example, an equalizer or trellis decoder, or a combination of both.

There are two prior art implementations for detecting the Sync pattern which is obtained from literature:
1. Adder Tree Method, and
2. Implementation with ROMs In a conventional synchronization circuit a circular buffer of size 1632 bits (one frame=204 bytes times 8 bits per byte) can be used to detect the repetitiveness of the sync pattern. Additionally one needs to track the occurrence of 7 or less sync patterns between two consecutive frame header patterns. Such an implementation is typically hardware intensive.

SUMMARY OF THE INVENTION

The invention presents a method of frame synchronization of Digital Video Broadcasting (DVB) data using a temporary storage area (regfile) of substantially smaller dimension than the repetitive rate of the sync pattern. Synchronization is achieved by detecting the sync pattern by correlation and determining if the pattern has a fixed repetitive separation. The transport stream can contain MPEG, ATM or HDLC data packets.

The synchronization scheme of the invention is simple and easily implementable as an integrated circuit, using software and a microprocessor, or as discrete circuitry.

DETAILED DESCRIPTION OF THE DRAWING

Figure 1:
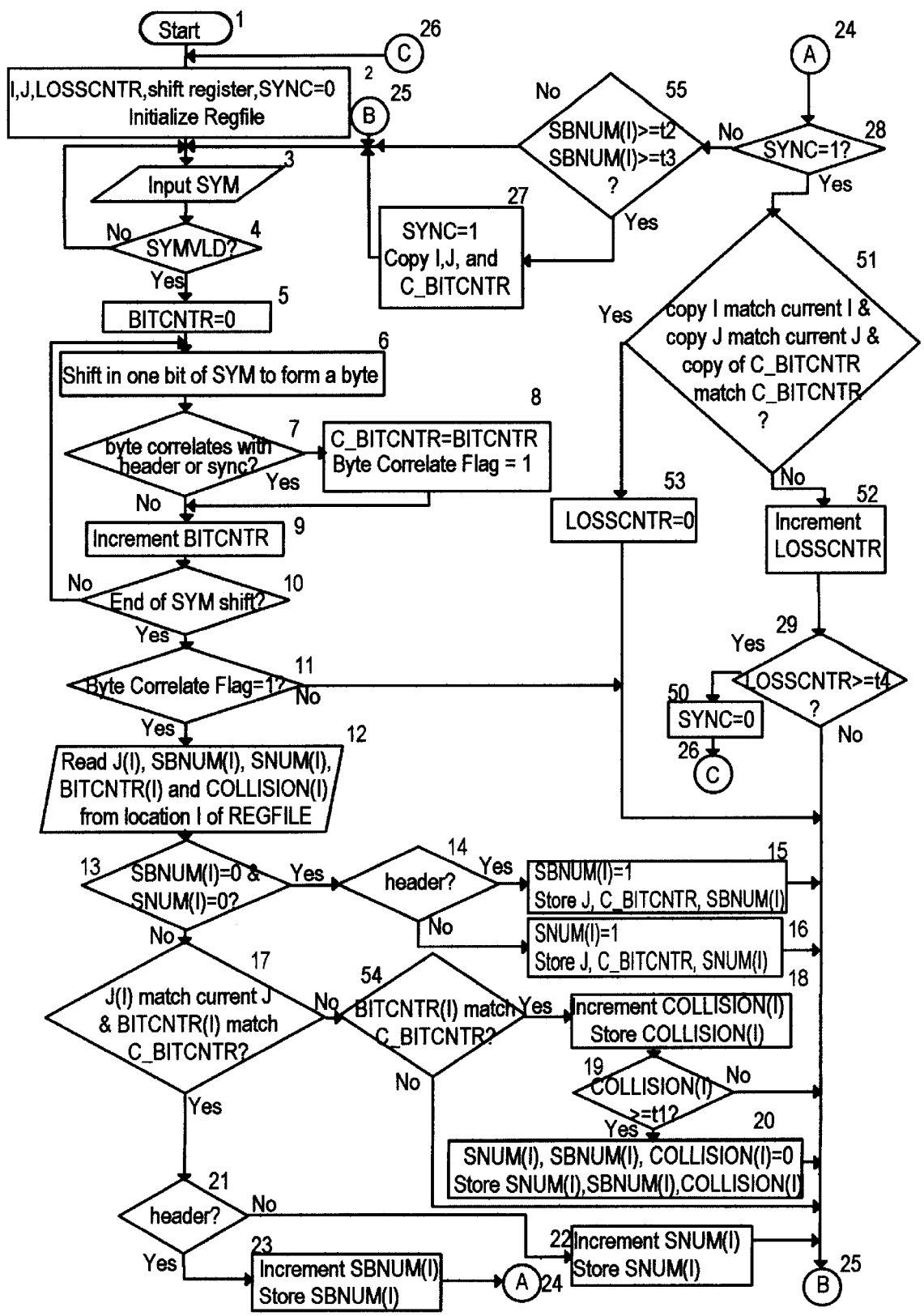
FIG. 1 shows a flowchart of the synchronization method of the invention

The synchronization technique of the invention is based upon bit level synchronization. The method of the invention achieves synchronization with the frame header of the framing structure transmitted as symbols. At the receiving end these symbols are shifted one bit at a time and each time the resulting byte is checked for the presence of a header or sync pattern (in the MPEG specification, the header pattern is the hexadecimal byte "b8", and the sync pattern is hexadecimal "47"). For the purposes of this method, the term "frame" means the occurrence of two header pattern bytes in the data stream, with seven sync pattern bytes between.

The following scheme achieves synchronization if it encounters a predetermined number of headers together with a predetermined number of syncs. The proper value for these predetermined numbers of occurrences can be determined through simulation with noisy data. In testing, the values of three and eight, respectively, have been found to be useful for the frame header and sync threshold numbers. Also, in the MPEG specification, the separation between two consecutive sync bytes (header and sync, or sync and sync) is 204 bytes, or (204×8) bits. Hence the method of the invention exploits the property of fixed distance repetition of the sync bytes in the symbol stream.

As for example, in the case of 4-QAM/QPSK modulation the number of bits/symbol is 2 and hence the sync separation will be (204 bytes×8 bits)/2 bits/symbol=816 symbols, or in the case of 64 QAM the number of bits/symbol is 6 and hence the sync separation will be (204×8)/6=272 symbols and so on.

For 32-QAM or 128 QAM, 204 is not divisible by the number of bits/symbol (5 and 7, respectively), so it will take a number of frames to achieve synchronization using the method of the invention. Thus, in the case of 32-QAM, the sync separation in symbols becomes:

(204 bytes×8 bits/byte)÷5 bits/symbol×5=1632 symbols

The number of symbols needs to be multiplied by five because (204×8)/5 is not a whole number (i.e. the number of bits is not divisible by five). Similarly, for 128 QAM, the sync separation is also 1632 symbols, since the symbol length is 7, and (204×8) is not evenly divisible by 7:

(204 bytes×8 bits/byte)÷7 bits/symbol×7=1632 symbols

The last column in Table 1 shows the separation (in symbols) between consecutive sync bytes (or header and sync bytes) except for the cases of 32-QAM and 128-QAM, where, because of the indivisibility of 204 by the number of bits/symbol, the sync separation includes more than one frame (204×8) bytes.

The synchronization scheme outlined herein takes at least (8×204) bytes of data (one frame) to achieve synchronization, except for the cases of 32-QAM (where it is 40 (i.e., 5×8)×(8×204) bytes) and 128-QAM (where it is 56 (i.e., 7×8)×(8×204) bytes).

TABLE 1

SYNCHRONIZATION INTERVALS

| MODULATION | BITS/ SYMBOL | SYNC SEPARATION (Symbols) |
|---|---|---|
| 4-QAM/QPSK | 2 | (204 × 8)/2 = 816 = 24 × 34 |
| 8-QAM | 3 | (204 × 8)/3 = 544 = 16 × 34 |
| 16-QAM | 4 | (204 × 8)/4 = 408 = 12 × 34 |
| 32-QAM | 5 | ((204 × 8) × 5)/5 = 1632 = 48 × 34 |
| 64-QAM | 6 | (204 × 8)/6 = 272 = 8 × 34 |
| 128-QAM | 7 | ((204 × 8) × 7)/7 = 1632 = 48 × 34 |
| 256-QAM | 8 | (204 × 8)/8 = 204 = 6 × 34 |

TABLE 2

Counter Format vs. Modulation Technique

| MODULATION | I | J |
|---|---|---|
| 4-QAM/QPSK | MOD 34 | MOD 24 |
| 8-QAM | MOD 34 | MOD 16 |
| 16-QAM | MOD 34 | MOD 12 |
| 32-QAM | MOD 34 | MOD 48 |
| 64-QAM | MOD 34 | MOD 8 |
| 128-QAM | MOD 34 | MOD 48 |
| 256-QAM | MOD 34 | MOD 6 |

Note from Tables 1 and 2 that we can assume that the pair of values (I, J) uniquely determine the location of sync bytes in the symbol stream. This would be sufficient if the symbol and byte boundaries were the same. However, in the event this is not the case, an additional counter, BITCNTR, is needed to keep track of the bit position at which the correlation occurred.

Hence, the fixed repetitive separation can be found using three counters:
1. I counter—fixed modulo 34 (6—bit counter)
2. J counter—programmable modulo (6—bit counter)
3. BITCNTR—fixed (3-bit counter)

It will also be noted in the last column of Table 1, that each of the sync separation figures is evenly divisible by 34. This implies, then, that a 34-word regfile is needed in this architecture. The following table shows the organization of the Regfile:

TABLE 3

Regfile Organization

| ADDRESS I | SYNC J | Bit Position BITCNTR | SBNUM | SNUM | COLLISION |
|---|---|---|---|---|---|
| 6 bits | 6 bits | 3 bits | 3 bits | 4 bits | 4 bits |
| 0 | | | | | |
| 1 | | | | | |
| 2 | | | | | |
| 3 | | | | | |
| 4 | | | | | |
| ... | | | | | |
| 33 | | | | | |

Note in Table 3 that BITCNTR stores the bit position of the correlation occurrence, SBNUM stores the number of correlations found with the header, SNUM the number of correlations for sync and COLLISION keeps count of cases when for a given value of I and BITCNTR, correlations are found for different J values.

Figure 2:
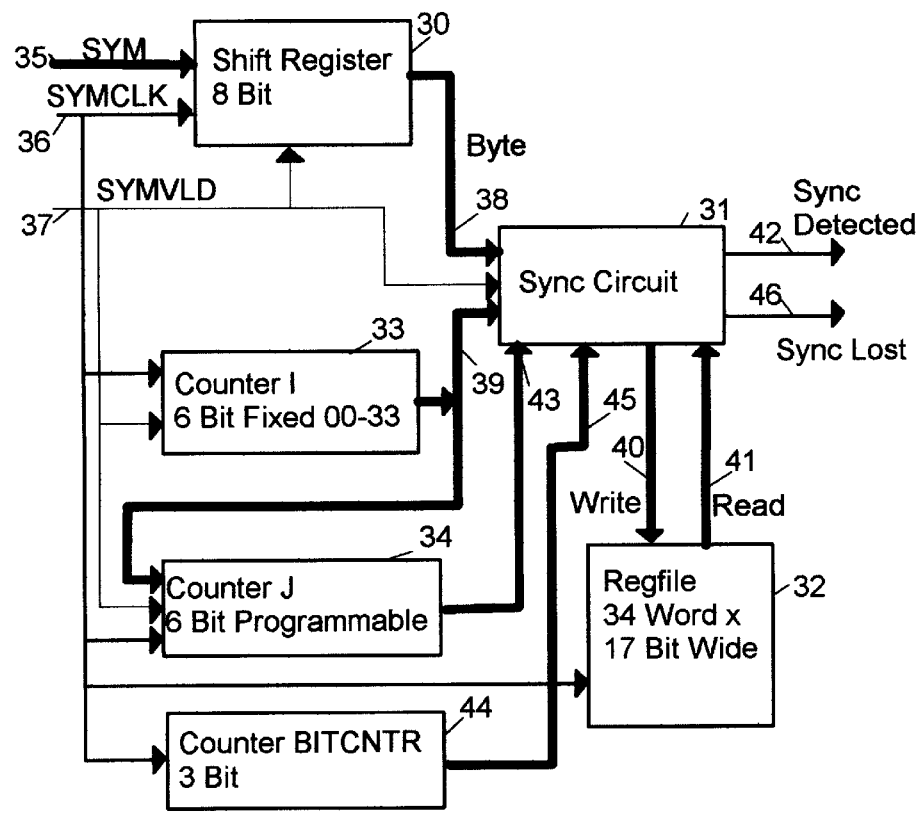
FIG. 2 shows a functional block diagram of an implementation of the method of the invention.

A flowchart of the method of the invention is shown in FIG. 1 of the drawing, and FIG. 2 shows a block diagram of the implementation of the method. The flow of the various signals may be seen in FIG. 2.

As can be seen in FIG. 2, the stream of input symbols to be decoded, SYM (35), and the symbol clock SYMCLK (36) are input to an 8-bit shift register (30). SYMCLK (36) also forms an input to three counters, I (33), J (34), and BITCNTR (44) and also to Regfile storage (32). An additional input SYMVLD (37) is an input to the shift register (30), sync circuit (31), and I (33) and J (34) counters. SYMVLD (37) indicates when a symbol in the SYM stream (35) is valid.

The output (38) of the shift register (30) is a stream of bytes assembled from the SYM stream, as described below, and becomes an input to the sync circuit (31).

Counter I (33) is a six-bit fixed modulo 34 counter, incremented by SYMCLK (36), whose output (39) may take on values from 00 to 33. Counter BITCNTR (44) is a three-bit counter, incremented by SYMCLK, whose output (45) may take on values between 0 and an upper limit, depending on the type of modulation. For example, in the case of 64 QAM, the number of bits per symbol is six, and hence BITCNTR would take on values of 0 to 5. For the 256 QAM example described in the flowchart, the symbols have eight bits, and BITCNTR takes on values between 0 and 7.

Counter J (34) is a programmable 6-bit counter, with inputs SYMCLK (36) and Counter I output (39). Counter J's modulo is programmed in accordance with the modulation method, as noted in Table 2, above. The output (43) of counter J (34) may thus take on different ranges of counts, depending upon the method of modulation of the input SYM. Thus, if the data stream is 64-QAM modulated, counter J (34) will be set to MOD 8, and the output (43) can assume values between 0 and 7. Counter outputs I (39) and J (43) are inputs to the sync circuit (31).

The sync circuit (31) is also set to read from (41) and write to (40) the Regfile storage (32), which in the example is 34 words in length by 17 bits in width. As shown in Table 3, above, the Regfile stores values for J, BITCNTR, SBNUM, SNUM, and COLLISION, indexed by count I.

When sync is detected, the sync circuit (31) signals this on the "sync detected" output (42). Optionally, a second output, "sync lost" (46) can be provided to signal the loss of synchronization.

It will be understood in the following discussion that the values of I and J need not be specifically incremented by this flowchart, since they are implicitly incremented by the SYMCLK clock, as explained in the block diagram of FIG. 2. Where the method speaks of "current" values for these counters, it will be understood that this means the value of the counters at the current step in the flowchart, which is driven by SYMCLK.

Referring now to flowchart FIG. 1, at the start up (1) the counters I, J and LOSSCNTR, as well as the shift register and Regfile locations are initialized to 0 (2).

A symbol (SYM) is read in (3). If the symbol is valid, as indicated by flag SYMVLD (4), BITCNTR is set to 0 (5) and the incoming symbol SYM is shifted one bit at a time into the shift register (6) to form a byte. For every bit shifted in, the resulting byte is then correlated with both the header and the sync (7) patterns (for MPEG, these patterns would be 0xb8 or 0x47). If either of the correlations is true (8), then the BITCNTR counter is copied to C BITCNTR, and the Byte Correlate Flag is set "on".

The BITCNTR is then incremented (9) and checked (10) for the end of SYM shift (eight bits, or a value of 7 in BITCNTR, for 256 QAM modulation, or some other end of symbol for other modulation, as discussed above). If the end of shift has not been reached, the method loops back to shift in another bit of SYM (6).

If the entire byte has been shifted, then (11) the Byte Correlate Flag is checked. If the Byte Correlate Flag is set, then this means that a header or sync byte correlation had been found in step (7), and the method proceeds to step (12). Otherwise, the method loops back (via connection "B" (25) on the flowchart) to read in another SYM at step (3).

A location I from the regfile is read (12). This gives us pre-stored values for J, BITCNTR, SBNUM, SNUM and collisions corresponding to that specific I location.

If SBNUM and SNUM are both 0 (13) then it indicates that for that particular I location no previous sync byte correlations have taken place. If (14) the byte value was correlated with header (that is, the byte is possibly a frame header), then SBNUM is incremented (actually, set to value of one since there were no previous hits, then SBNUM was 0) and J, C_BITCNTR and SBNUM are stored in the regfile (15). If the byte value is not correlated to the header byte value (thus it must have been a possible packet sync), then SNUM is incremented (set to one) and J, C_BITCNTR and SNUM are stored in the regfile (16). In each case, the flow then loops back to receiving the next SYM (3).

In comparison (17), the value of J in location I is matched with the current value for J, and the stored BITCNTR is matched with the copy of BITCNTR (C_BITCNTR) made in step (8).

If this comparison fails (i.e. either half is not true), then (54) the stored BITCNTR is matched with C_BITCNTR, and if they match, the value of collision is incremented (18) and compared (19) to a threshold value t1 (a value of six has been shown to be useful for this threshold, but other values may be used). If the value of collision exceeds the threshold, then collision, SNUM and SBNUM are all reset and stored in the regfile (20). In either case, or if comparison (54) failed, the method then returns to step (3) to read in another SYM.

If comparison (17) was true (the value of J in location I matches with the current value for J and the stored BITCNTR matches the copy of BITCNTR (C_BITCNTR) made in step (8)), then it indicates that the specific I location has had a previous incidence of a sync byte. Once again, the byte is compared (21) to the frame header value.

If it is not a match, indicating that the byte must be a packet sync, then SNUM is incremented and stored in the regfile (22), and the method loops back to step (3) (via connector (25) on the flowchart) to read in another SYM.

If it does match, indicating that the byte must be a frame header, then SBNUM is incremented and stored in the regfile (23). The method proceeds via connector "A" (24) to check if the SYNC indicator is "on" (28). If it is not, then (55) SBNUM is compared to a threshold (t2) and SNUM is compared to a threshold (t3). Experimentally, values of t2=3 and t3=8 have been found to be useful, but other values may be used within the teachings of the invention. If both values exceed their respective threshold, then (27) SYNC is set "on" and the values of I, J and C_BITCNTR are copied (these values are referred to as "copy I", "copy I", and "copy C_BITCNTR"), and the method loops back to step (3) to read in the next SYM. If comparison (55) fails (i.e. either SNUM or SBNUM are less than their respective thresholds) then the method loops back to step (3) to input another SYM.

If (28) the SYNC indicator was already "on" (meaning synchronization had been achieved previously), then (51) the copy I, copy J, and copy C_BITCNTR are compared to their current values. If all match, then (53) LOSSCNTR is reset and the method loops back to step (3) to read in another SYM.

Otherwise (52) LOSSCNTR is incremented, and the value of LOSSCNTR is checked (29) to see if it exceeds a threshold value t4 (a LOSSCNTR threshold value of t4=4 has been found to be useful, but other values can be chosen within the teachings of the invention). If the value of LOSSCNTR does exceed the threshold, that means synchronization has been lost. SYNC is set "off" (50), and the method loops back via connector "C" (26) to the beginning (2) to start over with a re-initialization. If the optional "sync lost" line (FIG. 2, (46)) is implemented, it might be set on at this point.

If the LOSSCNTR does not exceed the threshold, then the method then returns to step (3) to read in another SYM.

Figure 3:
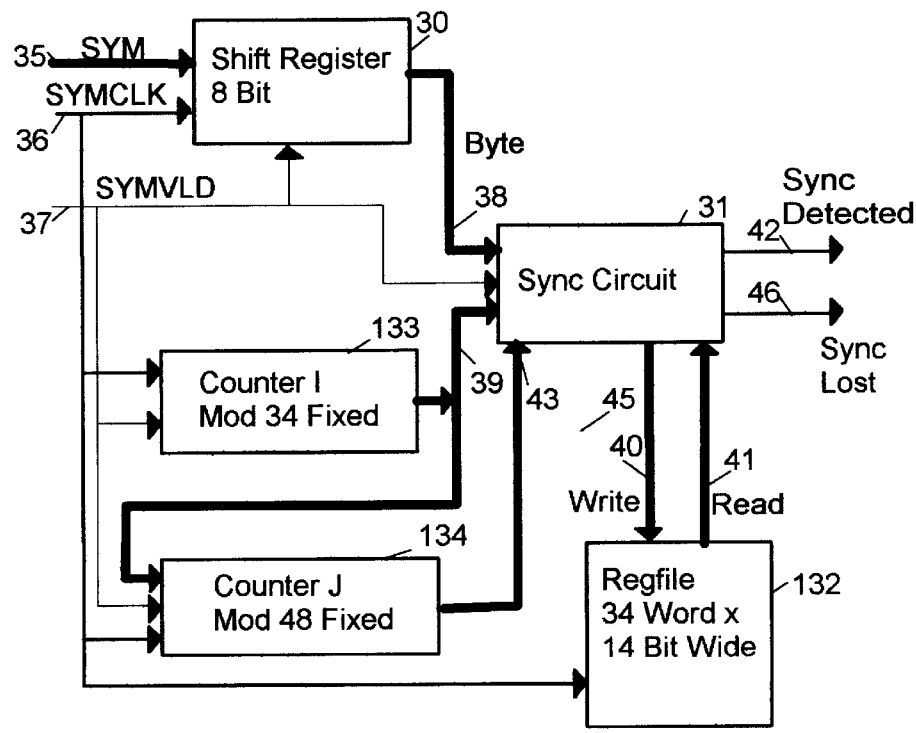
FIG. 3 shows a functional block diagram of an alternate embodiment of an implementation of the method of the invention.
Figure 4:
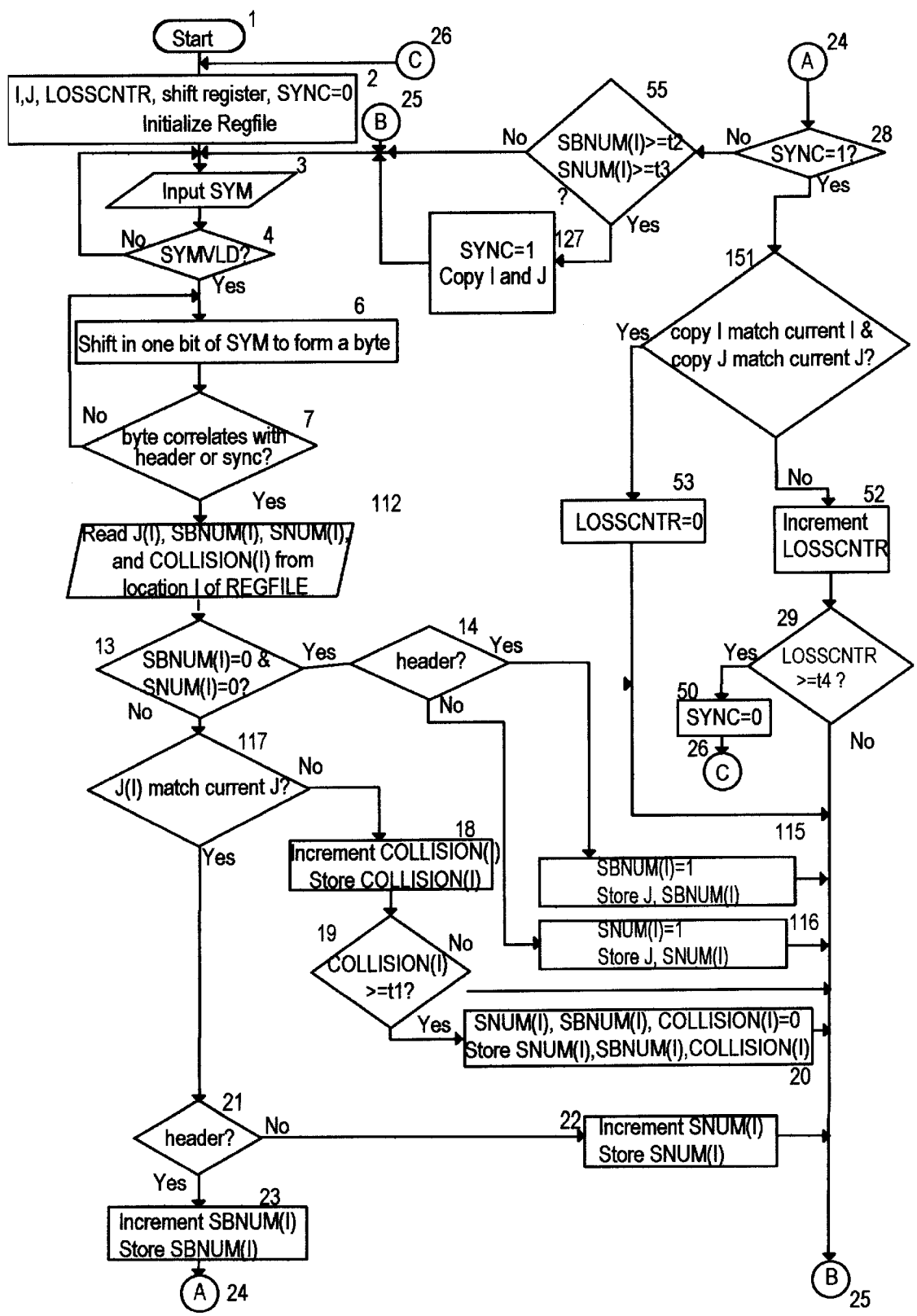
FIG. 4 shows a flowchart of the alternate embodiment of the synchronization method of the invention implemented in FIG. 3.

FIGS. 3 and 4 show an alternate embodiment of the invention, in which the bit-by-bit comparison of the data stream to the frame and sync patterns is done without the use of a bit counter (BITCNTR). This embodiment of the method has a number of advantages. In terms of hardware to implement the method, a counter and three bits of storage in the regfile are eliminated, hence the hardware is simpler and less expensive. In operation, this embodiment of the invention will synchronize in (204×8) bytes, regardless of modulation method (i.e. the multiplication by 5 or 7 for 32-QAM or 128-QAM is not required). Thus the embodiment is more general than the embodiment described above.

Illustrating this alternate embodiment, FIG. 3 is a functional block diagram corresponding to FIG. 2 of the embodiment described above, and FIG. 4 is a flowchart corresponding to FIG. 1. Since the two embodiments are similar, only those elements which differ between the two will be described in detail below. Identically numbered elements in each figure represent elements which are the same, and elements which differ from FIG. 1 to FIG. 4, or FIG. 2 to FIG. 3, are represented by a reference number with a "1" added, so that fixed I counter (133) in the alternate embodiment of FIG. 3 corresponds to programmable I counter (33) in FIG. 2, etc.

In the alternate embodiment of the invention, as can be seen in FIG. 3, the 3-bit counter BITCNTR is not used, and counters I (133) and J (134) are fixed counters of modulo 34 and 48, respectively. The regfile (132) is the same as regfile (32) in the embodiment of the method described above, except that, since there is no BITCNTR, it needs to be only 14 bits wide instead of 17 bits.

In the flowchart of the alternate embodiment shown in FIG. 4, it will be seen that the BITCNTR has been omitted, and steps concerned with initializing (5), incrementing (9), checking (10) and copying (8) the BITCNTR are similarly omitted. The byte correlate flag (11) is also omitted.

As can be seen in FIG. 4, SYM is read in one bit at a time (6), as in the previous embodiment. If the byte does not correlate with header or sync (7), the method loops back to shift in another bit. If it does correlate, then the method immediately moves on to read the regfile (112). In step (117) the comparison of the BITCNTR to the copy is no longer needed, and the method needs only to compare J(I) from the regfile to the current value of J. If there is no match, the method moves directly to increment COLLISION (18), omitting the comparison of step (54). Steps (115), (116), (151) and (127) differ from corresponding steps (15), (16), (51) and (27) in that the BITCNTR and C_BITCNTR are not used. The rest of the method performs as noted in the discussion of the previous embodiment, above.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of frame synchronization of a data stream comprising digital video broadcasting data having a synch pattern with a repetitive rate having a dimension, using a temporary storage area of substantially smaller dimension than the repetitive rate of the sync pattern, such that synchronization is achieved by detecting the sync pattern by correlation and determining if the pattern has a fixed repetitive separation.

2. The method of frame synchronization of claim 1, in which the synchronization is based upon bit level synchronization.

3. The method of frame synchronization of claim 1, in which the method achieves synchronization with the frame header of the framing structure transmitted as symbols.

4. The method of frame synchronization of claim 3, in which the symbols are shifted one bit at a time and each time the resulting byte is checked for the presence of a header or sync pattern.

5. The method of frame synchronization of claim 4, in which the header pattern is the hexadecimal byte b8.

6. The method of frame synchronization of claim 4, in which and the sync pattern is the hexadecimal byte 47.

7. A method of synchronization of a data stream containing a plurality of data symbols, such that synchronization of the data stream is defined as synchronization to a periodic appearance in the data stream of synchronization data elements correlating with first and second sync patterns, the data stream being coupled to first and second counters of selected modulo values related to the periodicity of the synchronization data elements, and using a regfile storage having a plurality of storage locations storing a plurality of values corresponding to at least a plurality of variables denominated J, SBNUM, SNUM and COLLISION, the storage locations being addressed by an index variable; the method comprising the steps of:

a) accepting an input data element comprising a preselected number of bits;

b) shifting in one bit of the data element to form a byte;

c) comparing the byte to the first and second sync patterns;

d) if the byte correlates to either the first sync pattern or the second sync pattern retrieving from the regfile location indexed by the current value of the first counter, the values of the variables J, SBNUM, SNUM and COLLISION; otherwise repeating from step (b);

e) if the value of SBNUM is zero and the value of SNUM is zero, and the byte correlates to the first sync pattern, incrementing the value of SBNUM in the regfile at the location indexed by the current value of the first counter, and repeating from step (a);

f) if the value of SBNUM is zero and the value of SNUM is zero, and the byte does not correlate to the first sync pattern, incrementing the value of SNUM in the regfile at the location indexed by the current value of the first counter, and repeating from step (a);

g) if the value of J does not match the value of the second counter, incrementing the value of COLLISION in the regfile at the location indexed by the value of the first counter, and then comparing COLLISION to a preselected threshold;

i) if COLLISION exceeds the preselected threshold, first resetting SBNUM, SNUM and COLLISION in the regfile at the location indexed by the first counter to zero; then repeating from step (a);

ii) if COLLISION does not exceed the preselected threshold, repeating from step (a);

h) if the byte does not correlate to the first sync pattern, incrementing the value of SNUM in the regfile at the location indexed by the current value of the first counter, and repeating from step (a);

i) incrementing the value of SBNUM in the regfile at the location indexed by the current value of the first counter;

j) if a SYNC flag is not set, then if the value of SNUM exceeds a preselected threshold value and the value of SBNUM exceeds a preselected threshold value, setting the SYNC flag, thereby indicating achievement of synchronization, and making copies of the first and second counters, and repeating from step (a);

k) if the value of I matches the value of the first counter and the value of J matches the value of the second counter, then setting a loss counter to 0, and repeating from step (a);

l) incrementing the loss counter;

m) if the value of the loss counter exceeds a preselected threshold, resetting the SYNC flag, thereby indicating loss of synchronization, and re-initializing the first and second counters and the loss counter and the byte; and n) repeating the method from step (a).

8. The method of claim 7, further comprising, before step (a), the step of initializing the values of the storage locations in the regfile to a preselected initial value.

9. The method of claim 7, in which the data stream is a digital video data stream.

10. The method of claim 9, in which the first sync pattern represents a frame header.

11. The method of claim 10, in which the first sync pattern is hexadecimal b8.

12. The method of claim 9, in which the second sync pattern represents a sync packet.

13. The method of claim 12, in which the second sync pattern is hexadecimal 47.

14. The method of claim 9, in which the data stream contains packets selected from the group of MPEG, ATM and HDLC.

15. The method of claim 7, in which the first counter is modulo 34.

16. The method of claim 7, in which the second counter is of a preselected modulo value related to the modulation method of the data stream.

17. The method of claim 7, in which the data stream is also coupled to a third counter having a modulo value related to the bit length of the data symbol, such that said third counter is incremented each time a bit is shifted from the data stream.

18. The method of claim 8, in which:
    a) the regfile storage also has a plurality of storage locations storing a plurality of values of a variable denominated BITCNTR;
    b) step (d) of the method further comprises the steps, between correlating to either the first sync pattern or the second sync pattern and retrieving from the regfile of:
        i) setting a byte correlate flag and storing the third counter value in a bit location variable;
        ii) repeating from step (b) until steps (b) to (d) have been repeated a number of times equal to the preselected number of bits in the input data element;
        iii) if the byte correlate flag is not on, repeating from step (a);
    c) the value of the variable BITCNTR is retrieved in step (d);
    d) in step (g), also comparing the value of the third counter to the value of BITCNTR;
    e) in step (j), also making a copy of the third counter;
    f) in step (k), also comparing the value of the copy of the third counter made in step (j) to the value of the third counter.

19. The method of claim 17, in which the third counter can have values related to the modulation method of the data stream.

20. A DVB frame synchronization system for synchronization of a data stream containing a plurality of data symbols, such that synchronization of the data stream is defined as synchronization to a periodic appearance in the data stream of synchronization data elements correlating with first and second sync patterns, comprising:
    a data clock having an output;
    a data stream input device clocked by the data clock;
    a synchronization circuit having first, second and third counter inputs, a data input coupled to the data stream input device, storage input/output, and a synchronization output;
    a first counter of selected modulo value related to the periodicity of the synchronization data elements, having a clock input coupled to the data clock and an output coupled to the first counter input of the synchronization circuit;
    a second counter of selected modulo value related to the periodicity of the synchronization data elements, having a clock input coupled to the data clock and a second input coupled to the output of the first counter, and an output coupled to the second counter input of the synchronization circuit;
    a regfile storage having a plurality of storage locations storing a plurality of values of at least a plurality of variables denominated J, SBNUM, SNUM and COLLISION, the storage locations being addressed by an index variable I, the regfile storage being coupled to the storage input/output of the synchronization circuit, such that the synchronization circuit can selectively index the index variable I to read and write values to the plurality of variables;
    such that the synchronization circuit operates according to the steps of
    a) accepting an input data element comprising a preselected number of bits;
    b) shifting in one bit of the data element to form a byte;
    c) comparing the byte to the first and second sync patterns;
    d) if the byte correlates to either the first sync pattern or the second sync pattern, retrieving from the regfile location indexed by the current value of the first counter, the values of the variables J, SBNUM, SNUM and COLLISION; otherwise repeating from step (a);
    e) if the value of SBNUM is zero and the value of SNUM is zero, and the byte correlates to the first sync pattern, incrementing the value of SBNUM in the regfile at the location indexed by the current value of the first counter, and repeating from step (a);
    f) if the value of SBNUM is zero and the value of SNUM is zero, and the byte does not correlate to the first sync pattern, incrementing the value of SNUM in the regfile at the location indexed by the current value of the first counter, and repeating from step (a);
    g) if the value of J does not match the value of the second counter, incrementing the value of COLLISION in the regfile at the location indexed by the value of the first counter, and then comparing COLLISION to a preselected threshold;
        i) if COLLISION exceeds the preselected threshold, first resetting SBNUM, SNUM and COLLISION in the regfile at the location indexed by the first counter to zero; then repeating from step (a);
        ii) if COLLISION does not exceed the preselected threshold, repeating from step (a);
    h) if the byte does not correlate to the first sync pattern, incrementing the value of SNUM in the regfile at the location indexed by the current value of the first counter, and repeating from step (a);
    i) incrementing the value of SBNUM in the regfile at the location indexed by the current value of the first counter;
    j) if a SYNC flag is not set, then setting the SYNC flag, thereby indicating achievement of synchronization, and making copies of the first and second counters, and repeating from step (a);
    k) if the value of I matches the value of the first counter and the value of J matches the value of the second counter, then setting a loss counter to 0, and repeating from step (a);
    l) incrementing the loss counter;
    m) if the value of the loss counter exceeds a preselected threshold, resetting the SYNC flag, thereby indicating loss of synchronization, and re-initializing the first and second counters and the loss counter and the byte; and n) repeating the method from step (a).

21. The frame synchronization system of claim 20, in which, before performing the operations of steps (a)–(p), the synchronization circuit initializes the values of the storage locations in the regfile to preselected initial values.

22. The frame synchronization system of claim 20, in which the data stream is a digital video data stream.

23. The method of claim 22, in which the data stream contains packets selected from the group of MPEG, ATM and HDLC.

24. The frame synchronization system of claim 22, in which the first sync pattern represents a frame header.

25. The frame synchronization system of claim 24, in which the first sync pattern is hexadecimal b8.

26. The frame synchronization system of claim 22, in which the second sync pattern represents a sync packet.

27. The frame synchronization system of claim 26, in which the second sync pattern is hexadecimal 47.

28. The frame synchronization system of claim 20, in which the first counter is modulo 34.

29. The frame synchronization system of claim 20, in which the second counter is of a preselected modulo value related to a modulation method of the data stream.

30. The system of claim 20, in which the system further comprises a third counter having a modulo value related to the bit length of the data symbol, such that said third counter is incremented each time a bit is shifted from the data stream.

31. The system of claim 30, in which:

a) the regfile storage also has a plurality of storage locations storing the values of a variable denominated BITCNTR;

b) step (d) of the method further comprises the steps, between correlating to either the first sync pattern or the second sync pattern and retrieving from the regfile of:
   i) setting a byte correlate flag and storing the third counter value in a bit location variable;
   ii) repeating from step (b) until steps (b) to (d) have been repeated a number of times equal to the preselected number of bits in the input data element;
   iii) if the byte correlate flag is not on, repeating from step (a);

c) the value of the variable BITCNTR is retrieved in step (d);

d) in step (g), also comparing the value of the third counter to the value of BITCNTR;

e) in step (j), also making a copy of the third counter;

f) in step (k), also comparing the value of the copy of the third counter made in step (j) to the value of the third counter.

32. The frame synchronization system of claim 30, in which the third counter can have values related to the modulation method of the data stream.

* * * * *